Figure 1:
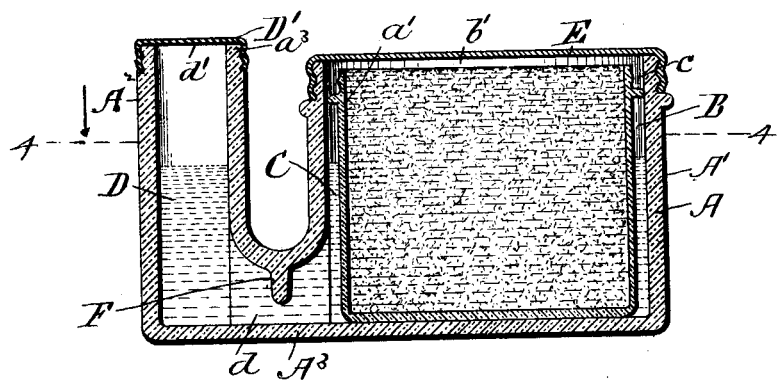

No. 675,970. Patented June 11, 1901.
F. F. RAYMOND, 2d.
PASTE POT OR JAR.
(Application filed Jan. 7, 1901.)
(No Model.) 6 Sheets—Sheet 1.

WITNESSES:
INVENTOR:

No. 675,970. Patented June 11, 1901.
F. F. RAYMOND, 2d.
PASTE POT OR JAR.
(Application filed Jan. 7, 1901.)
(No Model.) 6 Sheets—Sheet 2.

No. 675,970. Patented June 11, 1901.
F. F. RAYMOND, 2d.
PASTE POT OR JAR.
(Application filed Jan. 7, 1901.)
(No Model.) 6 Sheets—Sheet 4.

WITNESSES: INVENTOR:

No. 675,970. Patented June 11, 1901.
F. F. RAYMOND, 2d.
PASTE POT OR JAR.
(Application filed Jan. 7, 1901.)
(No Model.) 6 Sheets—Sheet 5.

WITNESSES: INVENTOR:

No. 675,970.   
F. F. RAYMOND, 2d.  
PASTE POT OR JAR.  
(Application filed Jan. 7, 1901.)  
Patented June 11, 1901.

(No Model.)

6 Sheets—Sheet 6.

WITNESSES:

INVENTOR:

UNITED STATES PATENT OFFICE.

FREEBORN F. RAYMOND, 2D, OF NEWTON, MASSACHUSETTS, ASSIGNOR TO THE CARTER'S INK COMPANY, OF BOSTON, MASSACHUSETTS.

PASTE POT OR JAR.

SPECIFICATION forming part of Letters Patent No. 675,970, dated June 11, 1901.

Application filed January 7, 1901. Serial No. 42,383. (No model.)

*To all whom it may concern:*

Be it known that I, FREEBORN F. RAYMOND, 2d, a citizen of the United States, residing at Newton, in the county of Middlesex and State of Massachusetts, have invented a new and useful Improvement in Paste Pots or Jars, of which the following is a full, clear, and exact description, reference being had to the accompanying drawings, forming a part of this specification, in explaining its nature.

An adhesive paste based upon dextrine or similar material is being now largely employed for various purposes and to a considerable extent as a substitute for liquid mucilage and glue. This paste is practically solid at atmospheric temperature, and has a tendency to harden or cake when exposed to the air or not supplied with moisture. The paste will also harden or cake upon the brush. An attempt has been made to prevent the hardening or caking of the paste in the pot and on the brush by arranging in the paste-holding chamber a small vessel for holding water, the evaporation of which provides moisture for the adjacent surface of the paste, and while the vessel and water are used as a means for holding the brush and also wetting and cleaning it. As such water-holding vessel has been contained in the paste-chamber its capacity has been very small for either purpose, and frequent replenishing with water was necessary. Aside from the limitation imposed by the size and arrangement of the vessel its location is inconvenient for the use of the paste-brush and the paste, and the double use of the same vessel in the paste-chamber for both purposes is not desirable, for the water soon becomes pasty, discolored, foul, and unfit for use. My invention not only overcomes these objections to the old type of paste-pot, but also provides a new form of paste-pot. To secure these results, the paste jar or pot is constructed to provide two water-holding chambers, which preferably are connected with each other, and one of which holds water contiguous to the paste-holder or paste-holding chamber for providing its surface with moisture by evaporation, and the other of which holds water for wetting the brush and also holds the brush. I shall hereinafter term the first water-holding chamber as the "evaporating-chamber" and the second water-holding chamber as the "brush-chamber." The evaporating-chamber may be located on one side only of the paste-holding chamber, or it may entirely surround the paste-holding chamber upon its sides and, if desired, upon its bottom as well, and when the evaporating-chamber is so arranged and constructed it will not only then supply the paste-chamber with an envelop of water which will serve to keep the wall of the paste-chamber or a considerable portion of it from the air, tend to reduce and keep constant the temperature of the paste in the paste-chamber, and provide it with additional moisture working through the wall or wall and bottom of the paste-chamber, but also increase the evaporating-surface of water, which, surrounding the paste-chamber, brings practically the entire surface of the paste within the range of the moisture and increases its extent or volume. The brush-chamber preferably is apart from the paste-chamber and preferably, though not necessarily, is connected with the evaporating-chamber by a passage. I prefer to arrange between the brush and evaporating chambers a partition which forms a water seal. Provision for a separate brush-chamber is desirable in that it affords means whereby it may be located independently of the paste-chamber and in convenient relation thereto. It also is a means of increasing the water-supply of the evaporating-chamber on the one hand, while the evaporating-chamber also serves to increase the supply of the brush-chamber, thereby increasing the quantity of water available for both purposes, and thus increasing the efficiency of the evaporating-chamber and the brush-chamber.

In the drawings I have represented various forms of paste-chamber and of the evaporating and brush chambers.

Figure 3:
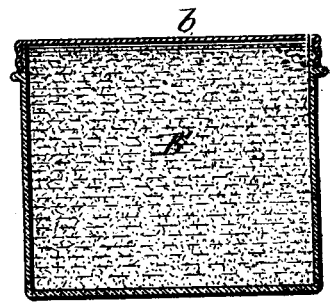
Figure 4:
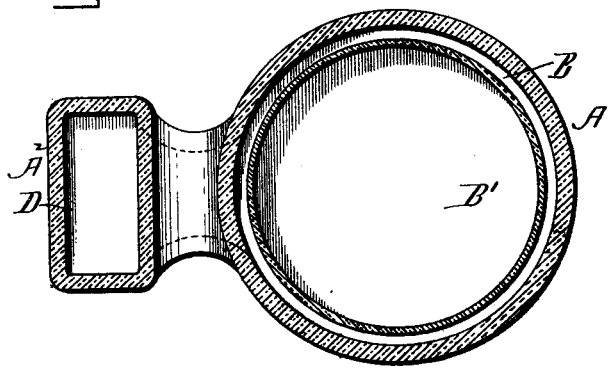
Figure 5:
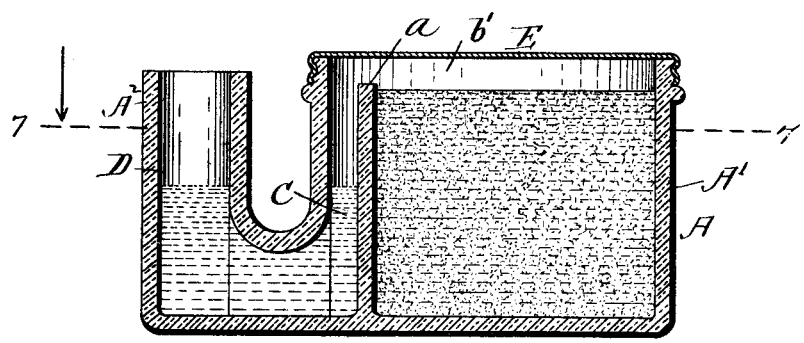
Figure 6:
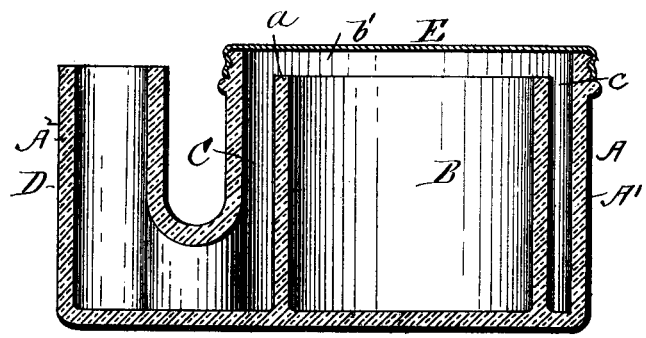
Figure 7:
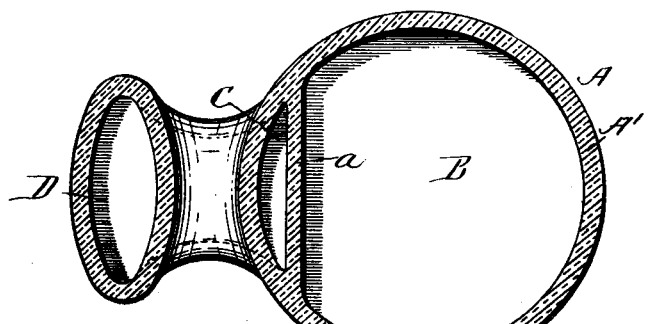

The wall of the paste-chamber may be integral with the remainder of the pot or jar, as represented in Figures 5, 6, and 7, or it may be formed by the wall of a removable paste-holder, as represented in Figs. 1 to 4, inclusive, and 8 to 10, inclusive.

Figure 2:
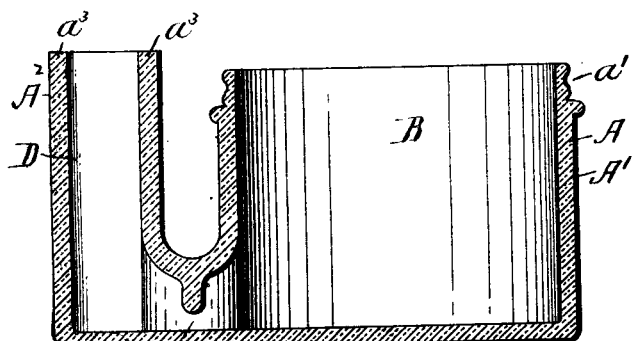
Figure 8:
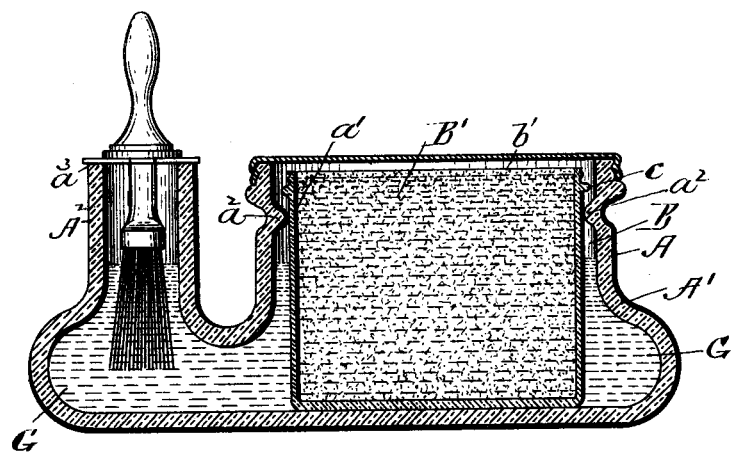
Figure 9:
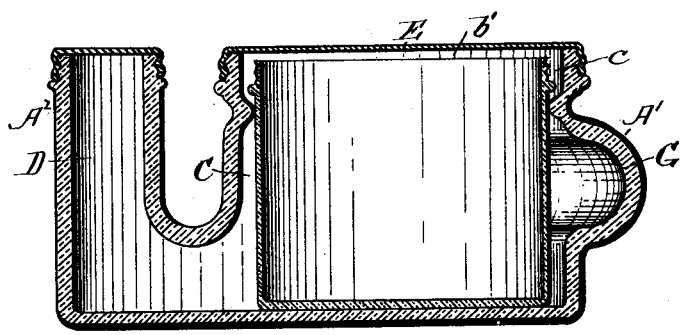
Figure 10:
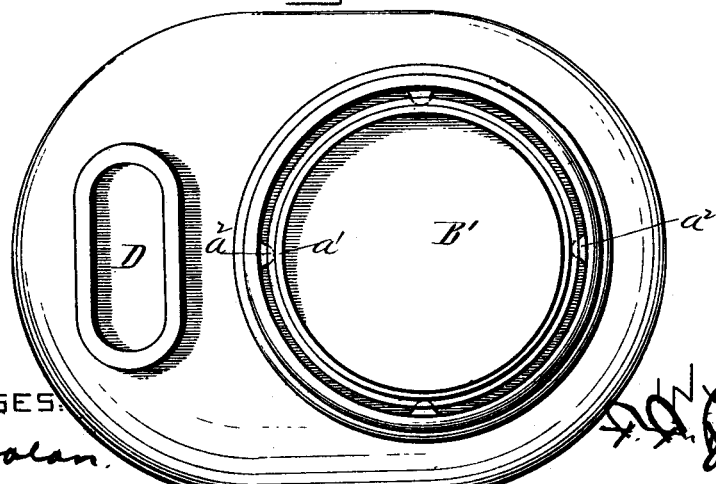
Figure 11:
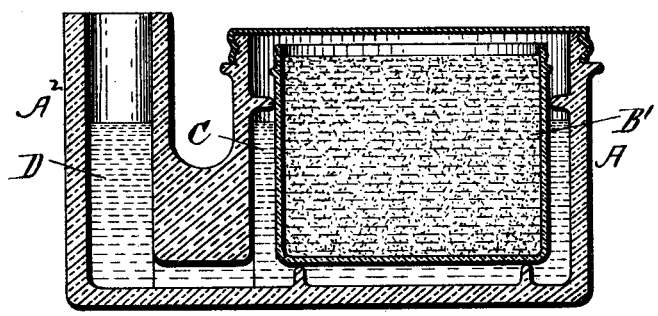
Figure 12:
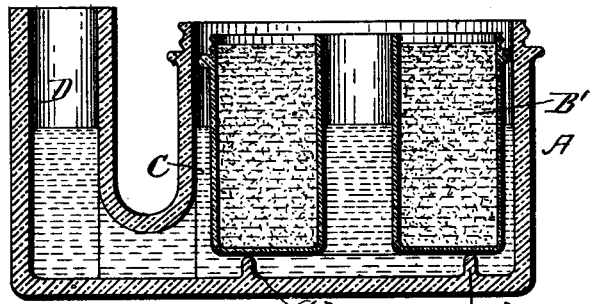
Figure 13:
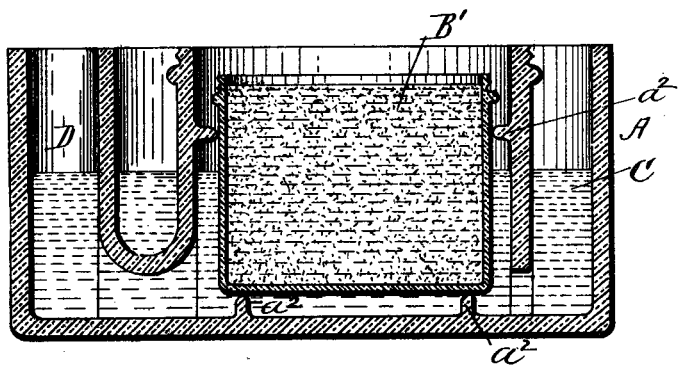
Figure 14:
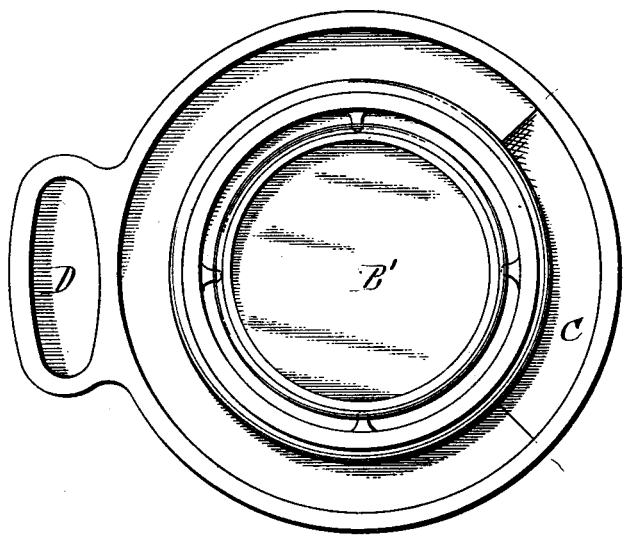
Figure 15:
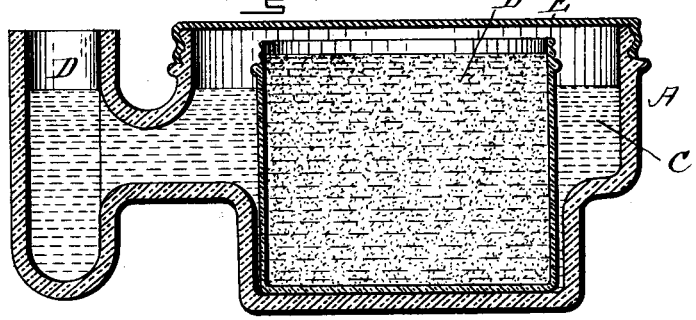
Figure 16:
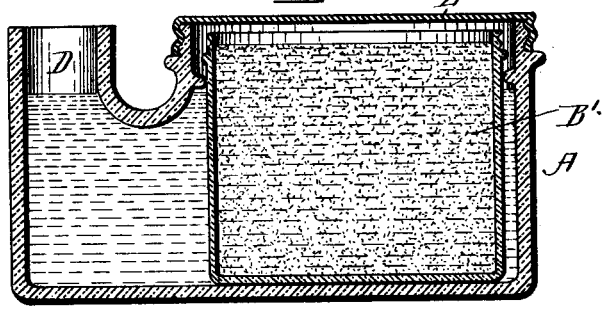
Figure 17:
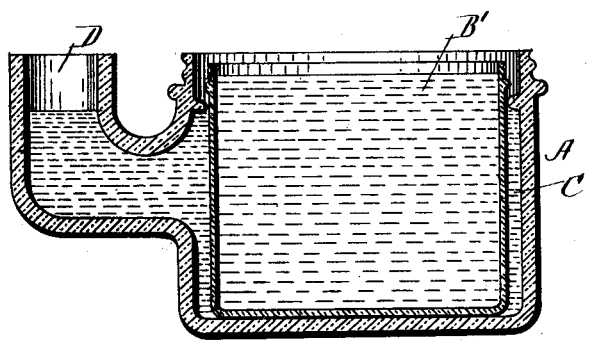
Figure 18:
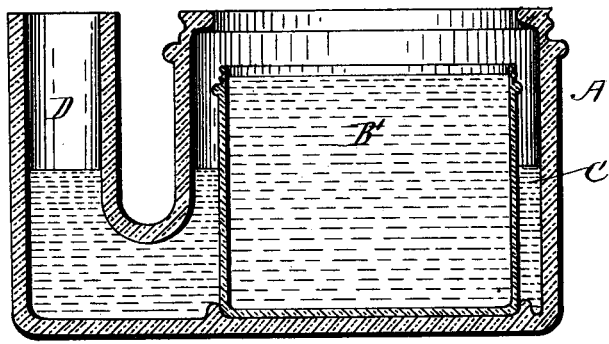

Referring to the drawings, Fig. 1 is a view in vertical central section of a paste pot or jar having the features of my invention. Fig. 2 is a view in vertical central section of the paste pot or jar used with a removable holder. Fig. 3 is a view in vertical section of the removable holder. Fig. 4 is a view in horizontal section upon the dotted line 4 4 of Fig. 1. Figs. 5 and 6 are vertical sections of modifications in which the paste-holder is integral with the remainder of the paste pot or jar. Fig. 7 is a view in horizontal section upon the dotted line 7 7 of Fig. 5. Figs. 8, 9, and 10 are views representing my improved paste pot or jar provided with reservoir-chambers. Fig. 11 is a view of a paste pot or jar, showing the holder as surrounded by water upon its bottom as well as upon its side. Fig. 12 shows a view of a paste-holder in which the paste-holder fits the jar and has an evaporation-chamber at its center. Fig. 13 shows a construction of paste pot or jar in which an auxiliary reservoir is provided for supplying the evaporating-chamber and the brush-chamber with an increased water-supply. Fig. 14 is a view in plan of the construction of Fig. 13. Fig. 15 represents a modification in which the paste-holder is held by a chamber of the paste-pot, which embraces the lower part of the holder and provides an evaporating-chamber above it. Fig. 16 is a view of a modification in which the water seal is eliminated. Fig. 17 is a view representing the water seal as eliminated and a shallow brush-well. Fig. 18 is a view of a slight modification in which the evaporating-chamber is represented as covered by a horizontal extension of the wall of the pot, so that the moisture of evaporation is caused to flow horizontally from the evaporation-chamber.

Referring to the drawings, A represents the complete paste pot or jar. It may be made of any suitable material. I prefer glass, earthenware, or metal.

B is the paste-holding chamber, which I will hereinafter term the "paste-chamber." In Figs 5, 6, and 7 it is represented as a fixture with the remainder of the paste pot or jar and is provided with the wall $a$, which is integral with the remainder of the pot or jar and may be in the form of a partition, as represented in Figs. 5 and 7, or cylindrical, as represented in Fig. 6, or may have any other arrangement, and the wall serves to separate the evaporation-chamber from the paste-chamber. In the other figures of the drawings the chamber for holding the paste is represented as removable, and for this purpose the chamber has an independent wall and bottom which forms a receptacle or holder for containing paste and in which it may be marketed independently of the remainder of the paste pot or jar. Its wall when in the paste pot or jar serves the purpose of the fixed wall $a$ in that it serves to form the evaporating-chamber and to separate it from the paste-chamber. I have lettered the independent or separable paste-holder B′ and its wall $a'$. It preferably has means, such as a cap $b$, for closing it when it is not contained in the paste pot or jar. (See Fig. 3.)

C is the evaporating-chamber, and D is the brush-chamber. The evaporating-chamber is any water-containing chamber which is separated from the paste-chamber by a partition and which is contained within the outer wall A′ of the paste-pot. It may be at one or more sides of the paste-chamber. It may entirely surround the paste-chamber. It may be surrounded by the paste-chamber. An illustration of the first arrangement is represented in Figs. 5 and 7, of the second in Figs. 1, 2, 4, 6, 8, 9, 10, and 11, and of the third in Fig. 12. Whatever its form or location, it is connected at its top $c$ with the top $b'$ of the paste-chamber, so that the moisture of evaporation shall freely pass from the evaporation-chamber to the surface of the paste in the paste-chamber, and to accomplish this the partition or wall separating the evaporation-chamber from the paste-chamber is made lower than the wall A′, so that with the main cover E upon the paste pot or jar there shall still be space between it and the upper edge of the partition for the connection between the evaporation-chamber and the paste-chamber. (See Figs. 1, 5, 6, 8, and 9.)

Where a removable paste-holder B′ is employed, it is desirable to hold it removed from the wall A′ of the pot or from the bottom or from both by means of isolated fingers $a^2$, extending inward from the wall, (see Figs. 8 and 10,) upward from the bottom, (see Figs. 11, 12, and 13,) or outward from the wall of the jar. Any other means may be used for accomplishing this purpose.

The brush-chamber D may be inclosed by the wall $A^2$ of the paste pot or jar, which is integral with the wall A′ and which is connected with the wall A′ by a neck $A^3$, in which is a passage $d$, connecting the brush-chamber D with the evaporating-chamber C. The brush-chamber has the opening $d'$ at its top, through which the brush is inserted into the chamber, and the surface $a^3$ of the wall $A^2$ about the opening serves as a rest for the flange of the brush. (See Fig. 8.) The water in both the brush-chamber and the evaporating-chamber will rise to the same level, and each chamber will act as a supply-chamber to the other. In Fig. 1 I have represented the wall $A^2$ of the brush-chamber as carried above the wall A′ in order that the water in both chambers may be carried at a higher level and not be disturbed by displacement when the brush is inserted into the brush-chamber. In Fig. 1 and some of the other figures the two water-chambers are represented as including a water seal F. This is obtained by locating the connecting-passage $d$ in or near the base of the pot or jar, so that the upper level of the lowest part of said passage shall be considerably below the average level of the water in the two chambers.

I do not confine myself to the use of a water seal. It is in some forms of construction and for some uses desirable in that it prevents the passage of air downward from the brush-chamber into the evaporating-chamber and thence to the paste-chamber when the main cap E is on the pot, and it is desirable to avoid this, as it would provide means for the escape of moisture from the evaporating-chamber which should only be supplied the paste-chamber and would decrease the efficiency of the evaporating-chamber.

I would here remark that one of the desirable features of the invention arises from the use of an imperforate cover E for sealing the evaporating-chamber and the paste-chamber when the jar is not in use, for as there is a separate brush-chamber it is not necessary that the main cover should have a hole in it for receiving a brush or for any other purpose.

The evaporating-chamber and the brush-chamber may have the same area of surface from top to bottom, as represented in Figs. 1, 2, 5, and 6, or the capacity of one or both may be increased by enlarging one or both of the chambers or to provide what in effect is an auxiliary or supply chamber for furnishing a larger quantity of water for evaporation and for feeding the brush-chamber than would otherwise be obtained. In Figs. 8 and 9, G represents this auxiliary or supply chamber furnished in Fig. 8 by an outward swell of the walls A' A², furnishing chambers in extension of both the evaporating and the brush chambers. In Fig. 9 an extension of the evaporation-chamber only is represented.

I would say here that the chambers may be supplied with water by pouring it into the brush-chamber or into the reservoir and without removing the cap from the paste-jar, the water in the evaporating-chamber being thus supplied from either the brush-chamber or the reservoir. This is of course when the chambers are being first filled with water or the water-supply in them is being renewed.

It will be understood that the placing of the removable paste-holder in the chamber of the pot, if it has previously been supplied with water, will cause the water to rise in the evaporating-chamber and in the brush-water-holding chamber and in the reservoir, if one be used, to a higher level, the height of which will depend upon the water in the chamber. It will also be seen that the placing of the removable paste-holder in the chamber of the pot immediately establishes therein the paste-holding chamber and the water-evaporating chamber.

In Fig. 1 I have shown the brush-chamber as provided with the cover D'. It will be seen that the wall A' of the pot or jar contains the evaporating and paste chambers, and the wall A² the brush-chamber.

In Fig. 11 I have represented a construction of paste-pot in which there is no or a very slight water seal. This is due to the size of the channel and the location of the partition between the two chambers.

In Figs. 13 and 14 the brush-holder is formed by what may be termed an "annular well" G', which separates it from the evaporating-chamber, which well extends from the front of the paste-pot to nearly the rear, terminating at the line c' c', between which lines at the rear it is bottomless, so that it connects with the evaporating-chamber C. This well will therefore be filled with water to the level of the water in the evaporating-chamber and will serve as an auxiliary or supply chamber.

Having thus fully described my invention, I claim and desire to secure by Letters Patent of the United States—

1. A paste-jar having a paste-holding receptacle, a water-holding receptacle, and a brush-holding receptacle, the wall of said paste-holding receptacle forming also one wall of said water-holding receptacle and being slightly lower than the wall of said water-holding receptacle, whereby when said water-holding receptacle is covered a passage will be provided for moisture from the top of the water-holding receptacle to the surface of the paste in said paste-holding receptacle, as described.

2. A paste-jar having a paste-holding receptacle, a water-holding receptacle, and a brush-holding receptacle, the wall of said paste-holding receptacle forming also one wall of said water-holding receptacle, in combination with a cover adapted to fit the wall of said water-holding receptacle, and said cover and said paste-holding receptacle being arranged as described, whereby a passage is provided for moisture from said water to the surface of said paste-holding receptacle, as described.

3. A paste-jar having a paste-holding receptacle, a water-holding receptacle, and a brush-holding receptacle connected thereto, said water-holding receptacle surrounding said paste-holding receptacle, whereby the water in said water-holding receptacle serves at all times both as a means for moistening the paste in said paste-holding receptacle, and also as a feeder to said brush-holder, as described.

4. A paste pot or jar having a chamber for receiving paste and a chamber for holding water for enveloping the sides of the paste-chamber, said water-holding chamber being open at its top and connected with the top of the paste-chamber, in combination with a brush-holding chamber connected with said water-chamber, whereby said water-chamber serves not only to moisten the paste but also as a feeder for said brush-chamber, as set forth.

5. A paste pot or jar, comprising a water-chamber, a paste-holder, and a brush-holder, said paste-holder being separable from said water-chamber, and said water-chamber being adapted to receive said paste-holder and having a relatively large capacity for holding water provided it by increasing its diameter between its top and bottom, and said brush-holder being connected to said water-chamber, as described.

6. A paste pot or jar having a paste-holder, a water-evaporating chamber located about said paste-holder, and a water-chamber for holding and moistening the brush, said paste-holder being separable from said water-chamber.

7. A paste pot or jar containing a paste-holder, a brush-holder and a water-chamber contiguous to said paste-holder and connected with it and said brush-holder, whereby the moisture from said water-chamber will at all times have access to the paste in said paste-holder, as and for the purposes described.

8. A paste pot or jar containing a paste-holder, a water-chamber and a brush-holder, said paste-holder being normally contained within said water-chamber but separable therefrom, as and for the purposes set forth.

9. A paste pot or jar containing a paste-holder, a water-chamber, a brush-chamber, and a passage connecting said water-chamber and said brush-chamber, whereby said water-chamber and said brush-chamber will mutually supply each other with water, said water-chamber being contiguous to said paste-chamber and adapted to constantly supply it with moisture, as and for the purposes set forth.

10. A paste pot or jar comprising within its outer walls a paste-holder, a water-chamber, and a brush-holder, said water-chamber being adapted to supply moisture to said paste-holder and to serve as a feeder for said brush-holder, as described.

11. A paste pot or jar having a water-chamber and a chamber for holding paste or the like, the wall of said paste-chamber serving also as the wall for said water-chamber, and a brush-holder having an opening apart from the opening to said paste and water chambers and separated from said water-chamber by a partition forming a water seal, in combination with a cap to cover said water-chamber and paste, and provide a passage for the conveying of the moisture of evaporation from said water-chamber to said paste-chamber, as described.

12. A paste pot or jar having within its wall a chamber, a removable paste-holder contained in said chamber partially filling the same and providing an exterior water-chamber having walls lower than the exterior walls of said water-chamber, and a cap adapted to cover said water-chamber and provide a passage between it and the upper surface of the paste in said paste-holder, and a brush-holder connected with said water-chamber, as described.

FREEBORN F. RAYMOND, 2D.

In presence of—
J. M. DOLAN,
SAUL SIPPUSTEIN.